(12) United States Patent
Buckley (10) Patent No.: US 10,944,436 B1
(45) Date of Patent: Mar. 9, 2021

(54) RF COMMUNICATION DEVICE USING ARTIFICIAL INTELLIGENCE (AI) MODEL AND ASSOCIATED METHODS

(71) Applicant: HARRIS GLOBAL COMMUNICATIONS, INC., Albany, NY (US)

(72) Inventor: Richard J. Buckley, Chandler, AZ (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 0 days.

(21) Appl. No.: 16/690,208

(22) Filed: Nov. 21, 2019

(51) Int. Cl.
*H04B 1/00* (2006.01)
*H04B 10/07* (2013.01)

(52) U.S. Cl.
CPC .................. *H04B 1/0007* (2013.01)

(58) Field of Classification Search
CPC ...................................... H04B 1/0007
USPC .................. 455/67.11, 67.13, 63.1
See application file for complete search history.

(56) References Cited

U.S. PATENT DOCUMENTS

| | | | |
|---|---|---|---|
| 4,394,666 A | 7/1983 | Kato et al. | |
| 6,965,568 B1 * | 11/2005 | Larsen .................. | H04W 8/005 370/238 |
| 7,590,395 B2 | 9/2009 | Buckley | |
| 7,664,492 B1 * | 2/2010 | Lee ........................ | H04W 16/28 455/422.1 |
| 9,154,239 B2 | 10/2015 | Dempsey et al. | |
| 9,854,447 B2 | 12/2017 | Liu et al. | |
| 10,362,539 B2 | 7/2019 | Oh et al. | |
| 10,362,545 B2 | 7/2019 | Wang et al. | |
| 10,362,546 B2 | 7/2019 | Kalhan | |
| 10,362,555 B2 | 7/2019 | Briggs et al. | |
| 10,362,569 B2 | 7/2019 | Cho et al. | |
| 10,362,571 B2 | 7/2019 | Rico et al. | |
| 10,362,573 B2 | 7/2019 | Halabian et al. | |
| 10,362,574 B2 | 7/2019 | Chendamarai et al. | |
| 10,362,575 B2 | 7/2019 | Wei et al. | |
| 10,362,576 B2 | 7/2019 | Wei | |
| 10,362,581 B2 | 7/2019 | Ahluwalia et al. | |
| 2019/0171965 A1 | 6/2019 | Ferguson et al. | |

OTHER PUBLICATIONS

Weingart et al., "A Method for Dynamic Configuration of a Cognitive Radio," 2006 1st IEEE Workshop on Networking Technologies for Software Defined Radio Networks; p. 93-100; SDR; ISBN-10: 1424407338, ISBN-13: 9781424407330; DOI: 10.1109/SDR.2006.4286331; Article No. 428633; Sep. 2006, pp. 1-8.

(Continued)

*Primary Examiner* — Lee Nguyen
(74) *Attorney, Agent, or Firm* — Allen, Dyer, Doppelt + Gilchrist, P.A.

(57) ABSTRACT

A radio frequency (RF) communication device includes an RF spectral sensor that senses a dynamically changing RF spectral environment, and RF circuitry having at least one settable parameter. A controller dynamically sets the at least one settable parameter thereby affecting power consumption and RF communication performance by using an artificial intelligence (AI) model based upon the power consumption and the RF communication performance in the dynamically changing RE spectral environment.

27 Claims, 5 Drawing Sheets

(56) References Cited

OTHER PUBLICATIONS

Haigh et al., "Parallel Learning and Decision Making for a Smart Embedded Communications Platform," Raytheon BBN Technologies; BBN Report—8579; Aug. 2015, pp. 1-22.
"Reconfigurable Hardware—an Overview," ScienceDirect Topics; (2005/2009/2010/2012/2014/2018); retrieved from the internet Jan. 15, 2020 https://www.sciencedirect.com/topics/computer-science/reconfigurable-hardware; pp. 1-12.
Wang et al., "Latency Analysis for Dynamic Spectrum Access in Cognitive Radio: Dedicated or Embedded Control Channel?", The 18th Annual IEEE International Symposium on Personal, Indoor and Mobile Radio Communications (PIMRC'07), 1-4244-1144-0/07, 2007, pp. 1-5.

\* cited by examiner

RF COMMUNICATION DEVICE USING ARTIFICIAL INTELLIGENCE (AI) MODEL AND ASSOCIATED METHODS

FIELD OF THE INVENTION

The present invention relates to the field of communications and, more particularly, to RF communication devices and related methods.

BACKGROUND OF THE INVENTION

Modern radio frequency (RE) communication devices operate over different communications networks and in different operational scenarios, for example, where the electromagnetic spectrum varies based on interfering signals, atmospheric conditions, noise levels, and other factors. Some RF communication devices operate as software-defined radios, where the channel waveforms are defined in the software, allowing the regular addition of more highly capable waveforms to help overcome network connectivity issues and operational problems. Even though numerous waveforms may be added, these RF communication devices do not change in size, weight and power consumption, and often are configured as handheld radios. The waveforms are generated as sampled digital signals, and converted from digital signals to analog signals via a wideband Digital-to-Analog converter (DAC) and then up-converted from an intermediate frequency (IF) to a radio frequency (RE) within the transmitter section of the RF circuitry.

Likewise, the receiver section of the RF circuitry extracts, down-converts and demodulates the channel waveforms, using the software running on its processor or controller, which may include Application Specific Integrated Circuits, microprocessors, or Field Programmable Gate Arrays. A variety of different waveforms and communication protocols are supported in the radio, but as the operational complexity of the radio increases, and the number of waveforms that are stored in the memory of the communication device increases, the power demand increases, creating concerns that in battery-powered radios, the radios will not only overheat, but also have decreased operating time.

These types of modern RF communication devices, and more particularly, software-defined radios, are able to change different waveforms depending on operational scenarios. The RF circuitry and controller often operate as if worst case operational conditions are continuously present to ensure that the radio will perform well under all operational scenarios. For example, the radio may operate most of the time at its strongest power to deliver its strongest signal, even when that excess signal power is not required. Conversely, the radio may limit its worst case performance to a configuration that satisfies the platform size, weight and power constraints in a continuous mode of operation, precluding any sort of 'burst' capability to temporarily reach beyond worst-case continuous conditions. These RF communication devices may also switch to a specific waveform and frequency, where the signal is less susceptible to noise and interference resulting from natural conditions or rogue operators, even though there may be other waveforms and frequencies that are better suited for these particular signal conditions. Even with improved propagation and operating conditions, the communication device may continue to transmit at a higher power, with a specific waveform, and in a specific frequency range, even though other operating parameters may provide better performance. Similar cases can be made for the companion receiver, which are often designed to make a one-time tradeoff of power consumption vs. RF performance (for example, linearity as described by third-order intercept point).

For example, these RF communication devices often include a transmitter power amplifier, which operates at its highest power level in many different operating scenarios. To transmit over a wide range of frequencies, however, this power amplifier and associated RF circuitry transmit at the maximum amount of power to meet worst case operating scenarios, which usually results in sub-optimum efficiency when the load impedances are good. Thus, not only may the operating parameters of the power amplifier at the transmitter be changed to match the load impedances, other RF circuitry may be optimized to draw the minimum amount of power required to communicate in a specific operational scenario-at-hand. This may include using different waveforms and communication protocols. A similar case can be made for the receiver function, with the prospect of changing operating parameters to optimize performance for a specific operational scenario-at-hand. Further, a radio may change waveforms and communication protocols or frequencies based on changes in the electromagnetic spectrum, for example, caused by rogue interferers or natural interference. The radio will still draw the maximum amount of required power that was used to meet the RF communication performance when the previous waveforms and communications protocols and frequencies were used. These types of radios may not adequately address the dynamically changing RF spectral environment, and as a result, the transmitter and receiver sections of the RF circuitry, power supplies and other radio components may not adapt adequately to the changing RF conditions and power requirements.

Some of these radios rely on information available at network edge devices that provide the entry point into enterprise or service provider core networks, which include routers, switches, integrated access devices (IAD's), multiplexers and other network access devices. These edge devices may provide connections into the carrier and service provider networks used in the cellular communication systems, such as the 5G system, and connect local area networks to high speed backbones, such as an ATM switch, and translate between different network protocols. Some edge devices include machine learning algorithms and detect changes in the RF environment, and transmit instructions to radios in the network to make corresponding adjustments. These edge devices may classify a spectrum environment and optimize both hardware and software parameters for all the radios in the network and update the network. However, any RF communication device in that network requires network connectivity and receives instructions from the edge device. The networked RF communication devices may be limited in their operational capability since each radio relies on an edge device for instructions and techniques to adapt or reconfigure the RF communication device. In some use cases, the edge device operator requires to work in a radio silence mode, without the ability to connect to a wider network for an extended period of time. However, this operator may benefit from radio performance optimization in this mode of operation, be it longer battery life when conditions are favorable and/or resistance to friendly or adversarial interference when communication conditions are unfavorable.

SUMMARY OF THE INVENTION

In general, a radio frequency (RF) communication device may include an RF spectral sensor configured to sense a dynamically changing RF spectral environment and RF circuitry having at least one settable parameter. A controller may cooperate with the RF spectral sensor and RE circuitry to dynamically set the at least one settable parameter thereby affecting power consumption and RF communication performance by using an artificial intelligence (AI) model based upon the power consumption and the RF communication performance in the dynamically changing RF spectral environment. The RF communication device may include a portable housing and a power supply carried by the portable housing and coupled to the RF spectral sensor, RF circuitry, and controller. The controller may be configured to periodically sample the RF spectral sensor and the AI model may include a plurality of spectral environment classifications. The AI model may be trained to set the at least one settable parameter to increase communications robustness when the RE communication performance is more difficult. The AI model may be trained to set the at least one settable parameter to decrease power consumption when the RF communication performance is less difficult.

The controller may be configured to store and update training data for the AI model. The controller may be configured to use the AI model without network connectivity. The controller may be configured to use the AI model with network connectivity. The at least one settable parameter may comprise a settable RF waveform parameter. The at least one settable parameter may also comprise at least one of a receiver gain stage parameter and a transmitter linearity parameter.

Another aspect is directed to a method of operating a radio frequency (RF) communication device that may comprise sensing a dynamically changing RF spectral environment with an RF spectral sensor. The method includes operating a controller that cooperates with RF circuitry and with the RF spectral sensor and dynamically setting at least one settable parameter within the RF circuitry thereby affecting power consumption and RF communication performance by using an artificial intelligence (AI) model based upon the power consumption and the RF communication performance in the dynamically changing RF spectral environment.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
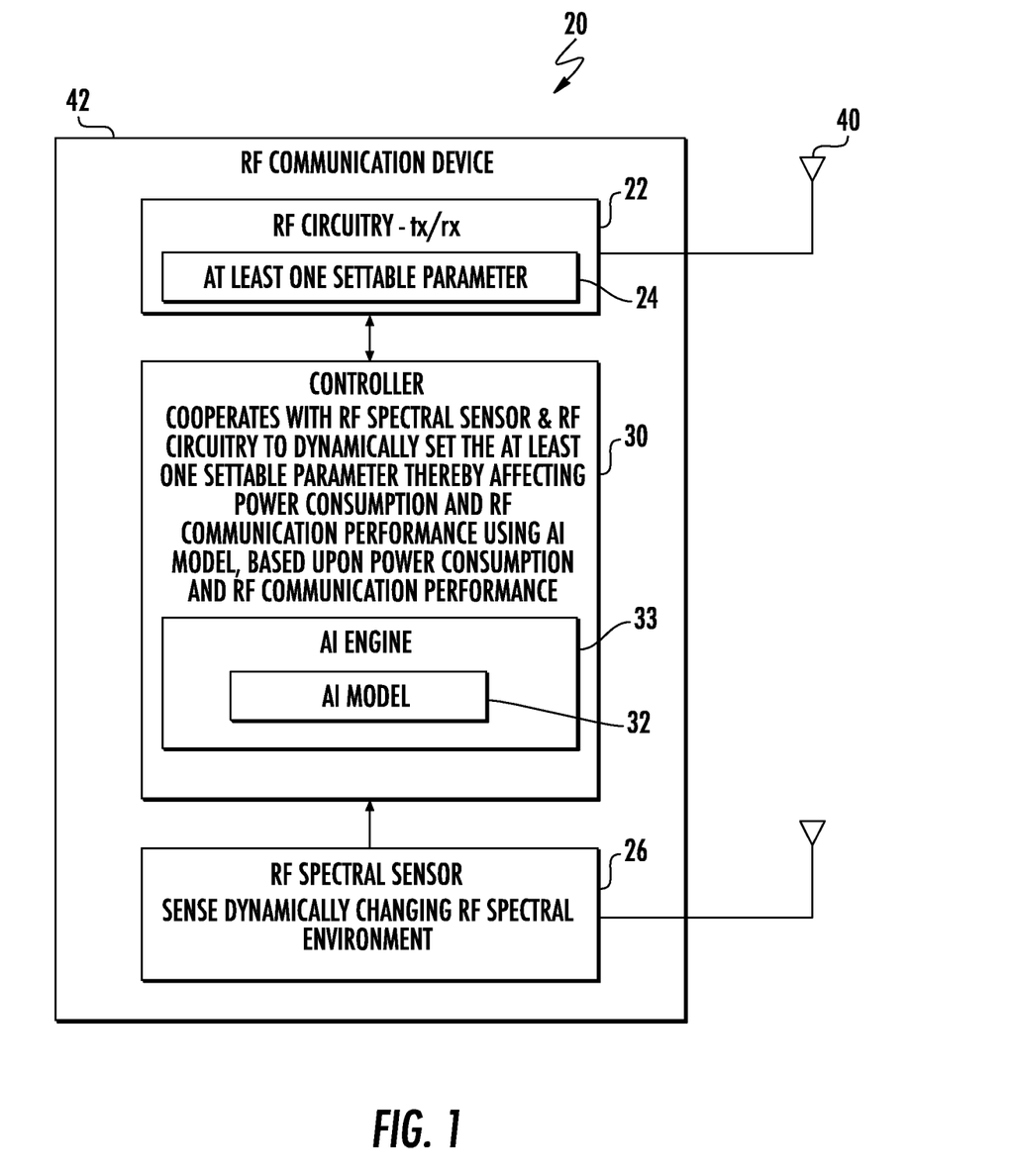
FIG. 1 is a block diagram of the radio frequency (RF) communication device according to the invention.

Referring initially to FIG. 1, a radio frequency (RF) communication device is illustrated generally at 20 and includes RF circuitry 22 having at least one settable parameter 24, and an RF spectral sensor 26 configured to sense a dynamically changing RF spectral environment. The RF circuitry 22 includes circuitry that forms a transmitter section and receiver section indicated generally by the tx/rx designation. A controller 30 is connected to and cooperates with the RF spectral sensor 24 and RF circuitry 22 to dynamically set the at least one settable parameter, thereby affecting power consumption and RF communication performance by using an artificial intelligence (AI) model, indicated generally at 32, based upon the power consumption and the RF communication performance in the dynamically changing RF spectral environment. Conversely, in some instances, the controller may dynamically sacrifice power consumption in order to temporarily optimize transmit and receive performance for the purposes of overcoming an otherwise unsustainable communications link. As explained in greater detail below, the AI model 32 may operate as part of an artificial intelligence (AI) engine 33, included within processing circuitry of the controller 30 or operative in a separate processor carried by the RF communication device 20.

Figure 2:
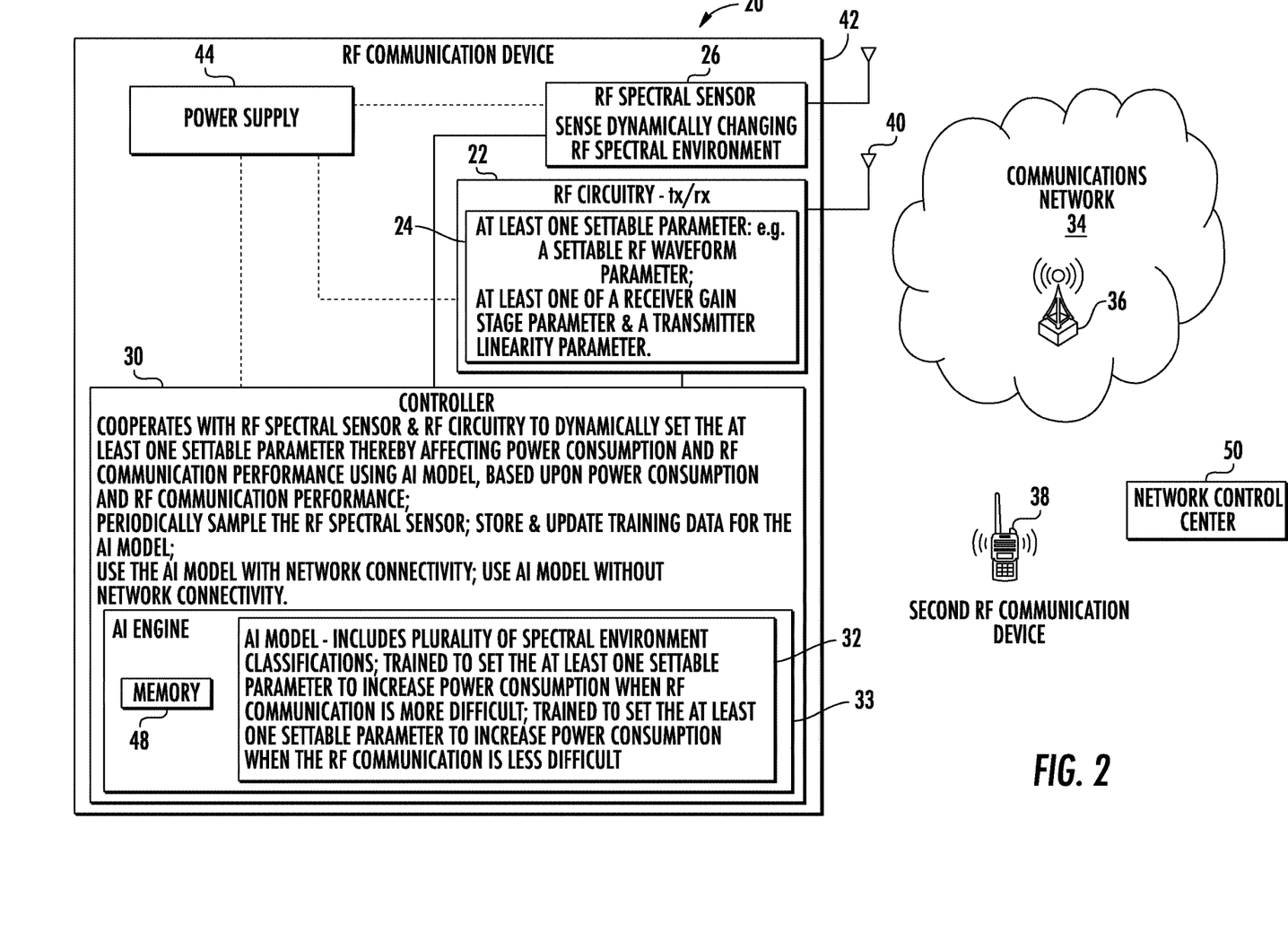
FIG. 2 is a more detailed block diagram of the RF communication device of FIG. 1 and a communications network.

Referring now to FIG. 2, greater details of the RF communication device 20 are illustrated. The RF communication device 20 may communicate over a communications network 34 to a higher-echelon network device 36, such as a fixed station with a router, or directly to a second communication device, or in some instances remain in receive mode for extended periods of time 38. The RF communication device 20 may transmit RE communication signals via its RE circuitry 22 through an antenna 40 over the communications network 34, which may be received at the higher-echelon network device 36, and/or received at the second RF communication device 38. The RF communication device 20 may communicate directly to the second communication device 38 or via/through the higher-echelon network device 36.

The RF communication device 20 includes a portable housing 42 that is configured for handheld use in one example, and a power supply 44 carried by the portable housing and coupled to the controller 30, RF spectral sensor 24, and RF circuitry 22. The controller 30 is configured to periodically sample the RF spectral sensor 26 and obtain data regarding the dynamically changing RF spectral environment. The AI model 32 includes a plurality of spectral environment classifications. The AI model 32 may be trained to set at least one settable parameter 24 in the RF circuitry 22 to increase communication robustness, which may be power consumption via the power supply 44 when the RF communication performance is more difficult. Increasing communication robustness could be at the possible expense of power consumption. On the other hand, the AI model 32 may be trained to set the at least one settable parameter 24 in the RF circuitry 22 to decrease power consumption when the RF communication performance is less difficult.

The controller 30 may be configured to store within a memory 48 any training data and update training data for the AI model 32 and save the updated training data in the memory. The controller 30 may be configured to use the AI model 32 with network connectivity when available, in order to optimize performance at the overall system level, and also report results to a higher retraining of the model, and receive data used in the AI model from the communications network 34 via a higher-echelon network device 36, the second communication device 38, or ultimately from a network control center 50. In another example, the controller 30 may be configured to use the AI model without network connectivity and the AI model 32 operates from data obtained by the RF spectral sensor 26 or from data already stored in the memory 48.

The memory 48 may also store a plurality of different waveforms, and the at least one settable parameter 24 at the RF circuitry 22 could include a settable RF waveform parameter, such as explained in greater detail below. In another example, the at least one settable parameter 24 could include at least one of a receiver gain stage parameter (for example, path gain or linearity) and a transmitter gain stage parameter (for example, power level or linearity). For example, a transmitter power amplifier as part of the transmitter section in the RF circuitry 22 could be adjusted as a transmitter linearity parameter.

The RF communication device 20 may classify radio spectrum versus the RF circuitry 22 and other radio hardware components and parameters, such as a Third-Order Intercept Point (TOIP), and change the RF circuitry and other hardware parameters to optimize for performance and power consumption in a fast, but low power manner. For example, the AI model 32 may be trained to set the at least one settable parameter to increase power consumption when the RF communication performance is more difficult, or it may be trained to set the at least one settable parameter to decrease power consumption when the RF communication is less difficult. No network connectivity may be required, since any artificial intelligence modeling and machine learning may occur within the RF communication device 20 itself, but network connectivity may be established for periodic artificial intelligence model updates.

The RF spectral sensor 26 may sense and measure the power and RF spectrum for known and unknown RF signals. The frequency, power, distortion, harmonics, bandwidth, and other spectral components of an RF signal may be observed to characterize the RF spectrum of different devices. The RF spectral sensor 26 may include swept-tuned analyzer circuitry that uses a superheterodyne receiver or an FFT circuitry that computes a time-sequence of periodograms. A swept-tuned type of RF spectral sensor 26 down-converts a portion of the input signal spectrum to a center frequency of a bandpass filter and sweeps a voltage-controlled oscillator (VCO) through a range of frequencies, as compared to an FFT-based RF spectral sensor where the waveform is measured in the Fourier transform. The RF spectral sensor 26 may also be used to measure the frequency response, noise and distortion characteristics of a device, and determine the occupied bandwidth and track interference sources.

Figure 3:
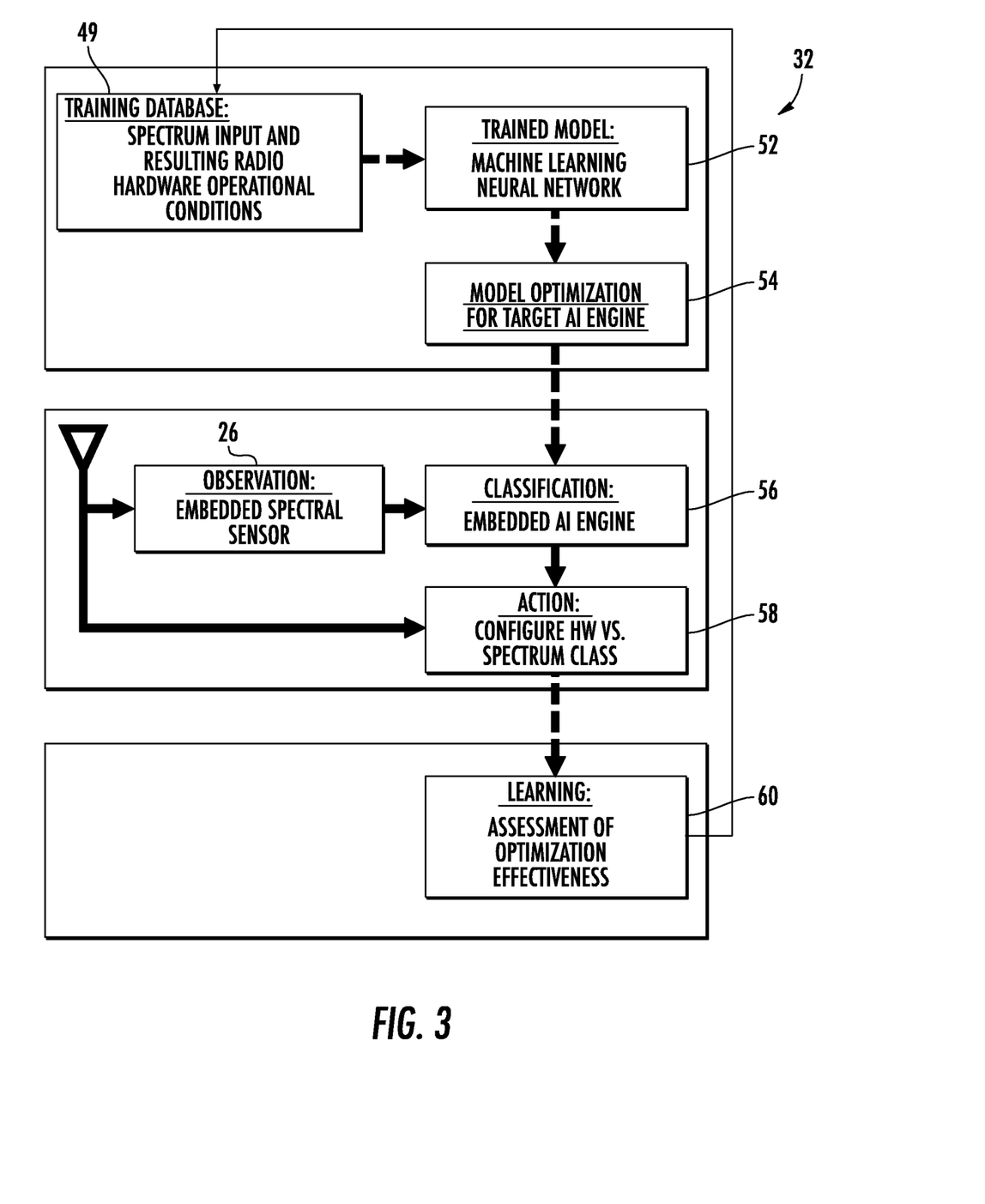
FIG. 3 is a block diagram of an artificial intelligence model that may be used with the RF communication device of FIG. 1.

Referring now to FIG. 3, there is illustrated greater details of the artificial intelligence model 32 that may include machine learning for optimum RF communication device operation. The controller 30 may be configured to cooperate with the artificial intelligence model 32 and use data stored in memory 48 for a training database 49 that may be built from spectral sensor data obtained from the RF spectral sensor 26 based on operational conditions. The AI model 32 may include a machine learning model that is trained based on the spectral data obtained from the RF spectral sensor 26. The AI model 32 may classify the incoming radio spectrum in terms of radio hardware-relevant classes of operation. The AI model 32 in an example is deployed on the controller 30 and include the artificial intelligence engine 33 cooperating with the trained model as a machine learning neural network 52, which is operative with a model optimization section 54 of the artificial intelligence engine 33.

The RF spectral sensor 26 senses the dynamically changing RF spectral environment and observes spectrum conditions in real-time. Data is generated and transferred to a classification section 56 of the AI model 32 for classification and action, where any hardware forming the RF circuitry 22 is configured versus the spectrum class 58. For example, the operating radio conditions may be classified into one of several radio hardware-relevant classes and radio hardware settable parameters may be optimized as a function of an identified class. These functions may be performed in a low power and low latency manner. The artificial intelligence model 32 includes a learning module 60 that observes and grades radio hardware optimization and feeds new data into the training database 49, which may be part of the memory 48, and periodically retrains the artificial intelligence model 32 and redeploys it with updates and improvements. In this learning module 60, an assessment may be made to optimize effectiveness.

As noted before, the controller 30 periodically samples the RF spectral sensor 26. The AI model 32 includes a plurality of spectral environment classifications. For example, there may be specific radio operational classes, such as a Spectrum Good class, where the power consumption is reduced by adjusting a settable parameter 24 on the RF circuitry 22, which may include a receiver gain stage, such as reducing the gain stage power. It is also possible to reduce the transmitter linearity as a settable parameter 24 of the RF circuitry 22. Other operational classes may include a Cosite Noise Floor class that changes the frequency in the receiver sections of the RF circuitry to avoid the unwanted noise 22 and/or changes the settings on transmit power amplifiers and other RF circuitry, and thus, reduces the interference at the receiver. A Cosite Intercept Point class may include a Third-Order Intercept Point (TOIP) assessment that may indicate a need to temporarily increase the linearity of the receive gain stages, and/or adjust variable filter parameters in the receive path, 22, and/or in some cases switch to a higher level mixer. Other classes include a Cosite Reciprocal Mixing class, where the receiver section of the RF circuitry 22 may retune a pre-selector, and a Cosite Receiver Protection class where the front end attenuation of the receiver section of the RF circuitry 22 may be activated. Another operational class may include an Enemy Jamming class that may reconfigure the RF circuitry 22 and other radio hardware for a different Low Probability of Intercept (LPI), Low Probability of Defect (LPD), or anti-jamming modes. As the AI model 32 learns and adapts, future operational classes may be added.

The AI model 32 may operate the RF communication device 20 in a low-latency, low power manner, and classify broad spectrum classes, and not detail any signal parameters, which results in a simplified AI model that may operate more efficiently. The RF spectral sensor 26 may sample periodically, which results in very low power on the average versus time. The AI model 32 may aid in mitigating signal interference with minimal operator intervention and extend battery life at the RF communication device 20 when conditions permit. Simulated test data could be added to the database in the device memory 48. Some training and model optimization may be processed external to the RF communication device 20 when the controller is configured to use the AI model with network connectivity, where data is gathered, such as from an existing knowledge base, and/or other radios in the network, allowing field data gathering and custom spectrum profiles.

The AI model 32 with machine learning allows the RE communication device 20 to be operated in stealth or transmitter-disabled conditions, including with radio silence, e.g., Emissions Control (EMCON), where the RF communication device 20 and other RF communication devices in a networked area may be required to stop transmitting for safety or security reasons. The AI model 32 may be modified to address other challenges, including spectrum dominance, where an in-depth characterization of signals in close proximity to the RF communication devices may be made for classifying friend and foe, classifying modulation, and classifying spectrum to provide ease of use. Spectrum may be shared with other RF communication devices once a full classification of other devices occurs.

The AI model 32 includes machine learning to not only minimize user intervention, but also maximize the availability of communications for the RF communication device 20, where the best waveform may be chosen for the real-time environment and efficient network routing occurs by choosing the best waveform in a more efficient manner. Dynamic spectrum allocation may be enhanced with the choice of different waveforms that are chosen based upon the data obtained from the RF spectral sensor 26, and whether there are clear, congested or contested signal environments. The RF communication device 20 could use autonomous power-efficient modes, and advanced cross-domain solutions for different security levels and mission life. Different frequency bands could be added, including the C-band and Ku-band for higher data rates. The controller 30 may be implemented with RF Silicon on Chip (SoC) technology and incorporate artificial intelligence and digital signal processing (DSP) math engines.

Use of the AI model 32 may be based upon the power consumption and the RF communication performance in the dynamically changing RF spectral environment and help overcome problems associated with jamming signals, but also improve the RF communication device operation by having minimal operator intervention at the RF communication device 20. A radio knowledge base may be incorporated within the memory 48 and built into the training data with specific radio parameters that are changed to mitigate the root causes of signal impairment. Conditions may be assessed as favorable to change the transmitter and receiver sections of the RF circuitry 22, reduce power consumption and extend battery life. Besides the input from the spectral sensor 26 that provides real-time spectral data, other data for the AI model 32 may include radio test data, factory test data, field test data, and network simulation data. The AI model 32 training can vary. Spectrum may be classified for training data and the output could be in percentages of what is most likely, such as a class Spectrum Good, corresponding to 0%, a class Cosite Blocking at 2.1%, a class Cosite Noise Floor at 0.1%, and a class Cosite Reciprocal Mix at 92%, which indicates that the receiver section of the RF circuitry 22 may have to be re-tuned. When the Cosite Receiver Protection class is about 5.8% in this example, then the front end attenuation in the receiver section of the RF circuitry 22 may be activated. In operation, the RF communication device 20 may take corrective action based on this information and assess effectiveness of each measure taken and the information is fed back into an updated artificial intelligence model 32.

The RF communication device may operate in a normal mode without using the AI model 32, or operate in a machine learning mode by using the AI model. For example, in the normal mode, the receive signal strength (RSSI) may be about −60 dBm with no interfering signals. The signal-to-noise (SNR) ratio on the other end of the link could be strong and the power level of a transmitter section of the RF circuitry 22 may be sufficient for normal communications. The average DC power consumption for the power supply 44, e.g., the battery, may be acceptable, but desirably less. For example, the battery life remaining for the RF communication device 20 may be acceptable, but the radio temperature may be warm and heating up the RF circuitry 22 and other components. Under a normal mode, the receiver section of the RF circuitry 22 could have any automatic gain control (AGC) configured for the best waveform signal-to-noise (SNR), and any network routing, such as a MANET, may be selected for the best throughput and highest data rate. The transmitter section of the RF circuitry 22 may be chosen for maximum power in these circumstances, resulting in a reliable communications link. Any machine learning in association with the AI model 32 may be accomplished by manual simulations and field testing and analysis of the results, resulting in possible software upgrades.

In a machine learning mode, when the controller 30 adjusts a settable parameter 24 to affect power consumption and RF communication performance in conjunction with the AI model 32, a determination may be made of what signal-to-noise (SNR) is required on the other end of the communications link and a transmitter emissions mask for the RF circuitry 22 may be determined. Any AGC may be configured, but also the receiver section of the RF circuitry 22 may have its linearity configured for less power consumption and its transmitter section configured for less power consumption. This results in maximized battery life with minimal temperature rise and maximum product reliability. Learning may occur by automated initial training sequences and automated, real-time refinement of algorithms and weights.

If there are interfering signals, then a normal mode of operation with the machine learning in the AI model 32 would operate somewhat differently, for example, in a case where the receive signal strength (RSSI) is about −90 dBm as a solid signal, but −30 dBm for interfering signals, as compared to the −60 dBm when there were less difficult conditions when operating under this normal mode of operation. The SNR on the other end of the communication link may be poor and the transmitter power level in the transmitter section of the RF circuitry 22 may be maximized. In this communications scenario, the RF circuitry 22 may heat up, and the results could be lower data rates under more difficult conditions, or be limited to no communications if the conditions become very difficult.

In a machine learning mode, on the other hand, the RSSI and overall RF signal strength may be the same, but determinations could be made, for example, with a satellite connection, that any satellite communications could be at 300.1 MHz and have a −62 dBm RSSI. The transmitter signal emissions may be masked. The controller 30 could respond by invoking signal cancellation, antenna directionality, tuning for cosite mitigation, and tuning for internal pre-selectors to maximize rejection of unwanted signals. Maximum receiver linearity could be adjusted and the transmitter section of the RF circuitry 22 may be configured for maximum power. Even if there are still no communications, it is possible to switch to a LPI/LPD/AJ mode that may be part of the RF communications device 20, or switch waveforms and switch to a different frequency band. The results may maximize feasible data rates in difficult conditions and maximize connectivity in those difficult conditions.

The controller 30 may determine the type of signals that create a difficult RF communication performance and take corrective action. A machine learning algorithm may determine different responses. Spectrum "plots" may be generated based on past experience and known RF performance specifications. For example, data about spectrum impairments may be gathered to determine a training platform as part of the machine learning process for the AI model 32. The machine learning process may identify various segments of the radio spectrum, and use identifying graphical analysis. For example, a graphical analysis may include the height corresponding to amplitude bins, the width corresponding to frequency bins, and the depth corresponding to time bins. The graphics may be reformatted to a different graphical format using convolution and matrix multiples and accumulates by processing with Field Programmable Gate Arrays (FPGA's) or other processors as part of the controller 30, and followed by multiple convolutions.

Figure 4:
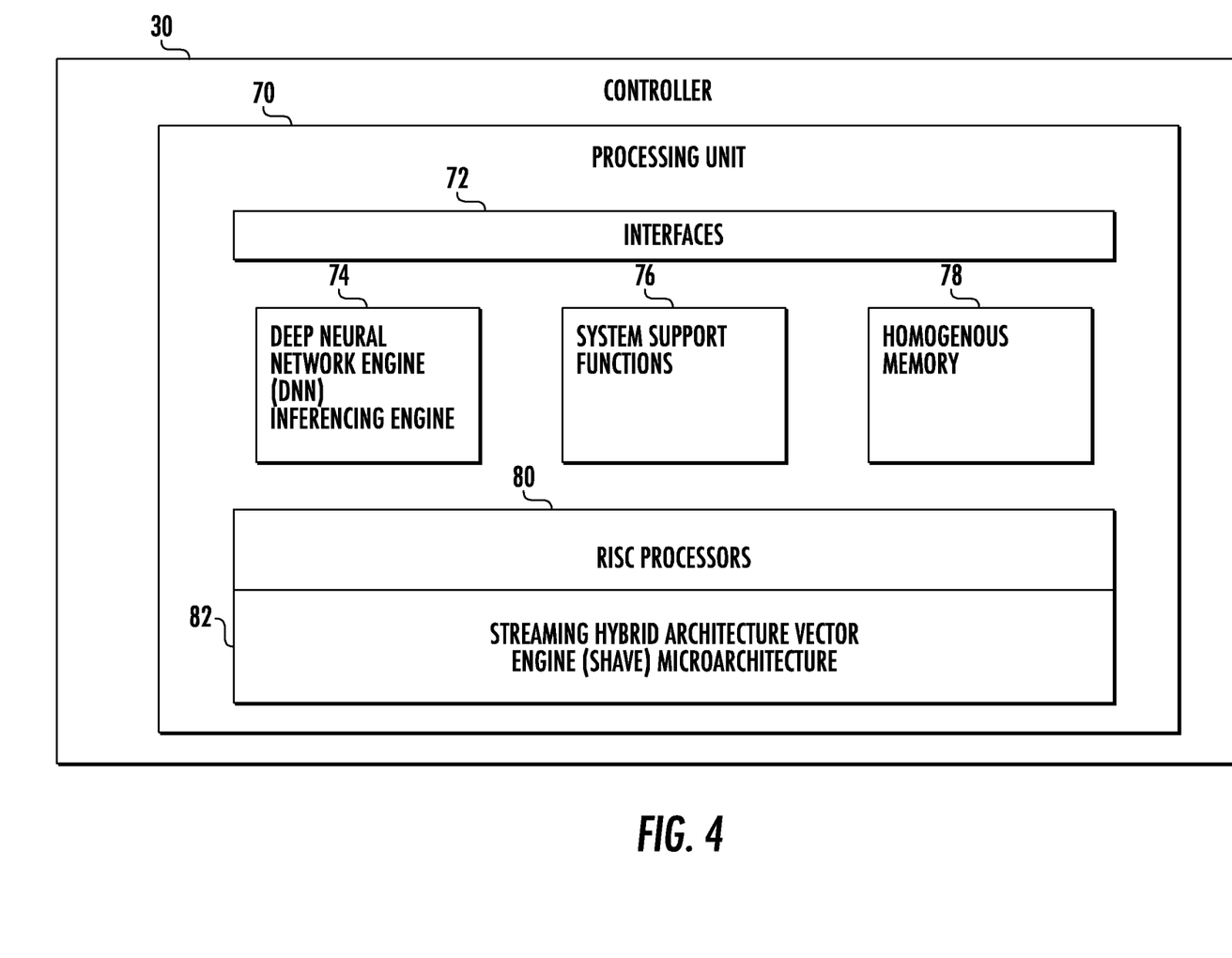
FIG. 4 is a block diagram of a processing unit that may be used with the artificial intelligence model of FIG. 3.

Referring now to FIG. 4, there is illustrated generally at 70 a processing unit that may be part of the controller 30 and incorporate the functionality of the AI engine 33 and AI model 32 with machine learning. The processing unit 70 may include interfaces 72 to other sections of the controller 30 and include a deep neural network (DNN) engine 74 that infers the classification of the incoming spectral signal in a real-time manner. Programmable processing cores may be optimized for speed and/or accuracy of the inference decisions and be included in system support functions 76. The processing unit 70 may include a homogenous memory 78 designed for low power latency and high performance, and include RISC processors 80 having RTOS schedulers, pipeline managers, and sensor control frameworks. Applications may be made in the Python or C/C++ programming languages. In an example, the processing unit 70 may perform multiple 128-bit vector operations and have parallel multiple load/store, scalar floating-point calculations, integer calculations, and control-flow operations in a single clock cycle, such as accomplished with a Streaming Hybrid Architecture Vector Engine (SHAVE) microarchitecture 82.

Figure 5:
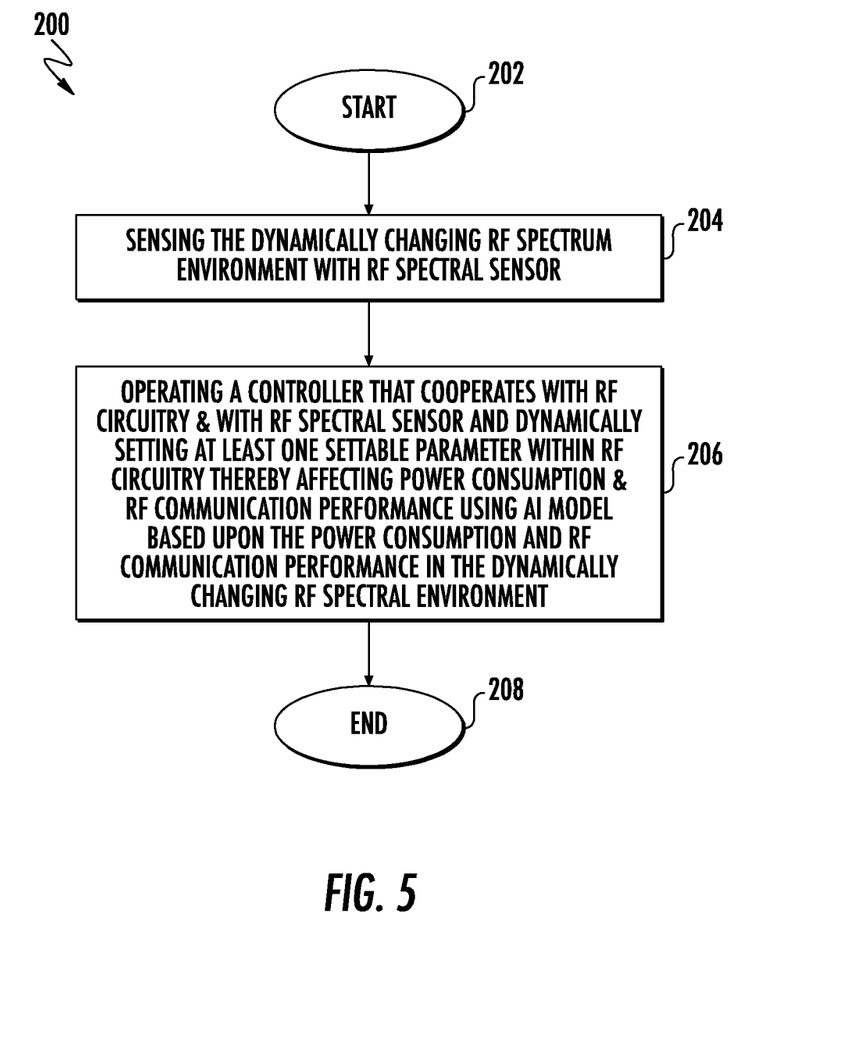
FIG. 5 is a high level flowchart of a method for operating the RF communication device of FIG. 1.

Referring now to FIG. 5, there is illustrated a high level flowchart for a method of operating the RF communication device of FIG. 1 and illustrated generally at 200. The process starts (Block 202) and the method includes sensing a dynamically changing RF spectrum environment with an RF spectral sensor 26 (Block 204). The method further includes operating a controller 30 that cooperates with RF circuitry 22 and with the RF spectral sensor 26 and dynamically setting at least one settable parameter 24 within the RF circuitry thereby affecting power consumption and RF communication performance by using an artificial intelligence (AI) model based upon the power consumption and the RF communication performance in the dynamically changing RF spectral environment (Block 206). The process ends (Block 208).

The AI model 32 may be incorporated with an AI engine and use RE Silicon on Chip (SoC) based architectures. The RF communication device 20 may provide spectrum dominance with in-depth characterization of signals in close proximity with classification of friendly and foe signals, modulation type, and other spectrum dominating factors. Spectrum collaboration may use available spectrum with these ease use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) communication device comprising:
   an RF spectral sensor configured to sense a dynamically changing RF spectral environment;
   RF circuitry having at least one settable parameter; and
   a controller cooperating with the RF spectral sensor and RF circuitry to
   sample the RF spectral sensor,
   determine, based upon the sampling, a current spectral environment classification of an artificial intelligence (AI) model from among a plurality of spectral environment classifications of the AI model, each spectral environment classification of the AI model including at least one respective setting for the at least one settable parameter of the RF circuitry based upon power consumption and RF communication performance of the RF circuitry, and
   operate the RF circuitry using the at least one respective setting for the at least one settable parameter of the RF circuitry according to the current spectral environment classification of the AI model.

2. The RF communication device of claim 1 comprising:
   a portable housing carrying the RF spectral sensor, RF circuitry, and controller; and
   a power supply carried by the portable housing and coupled to the RF spectral sensor, RF circuitry, and controller.

3. The RF communication device of claim 1 wherein the controller is configured to periodically sample the RF spectral sensor.

4. The RF communication device of claim 1 wherein the AI model is trained so that communications robustness is increased when the RF communication performance is more difficult.

5. The RF communication device of claim 1 wherein the AI model is trained so that power consumption is decreased when the RF communication performance is less difficult.

6. The RF communication device of claim 1 wherein the controller is configured to store and update training data for the AI model.

7. The RF communication device of claim 1 wherein the controller is configured to use the AI model without network connectivity.

8. The RF communication device of claim 1 wherein the controller is configured to use the AI model with network connectivity.

9. The RF communication device of claim 1 wherein the at least one settable parameter comprises a settable RF waveform parameter.

10. The RF communication device of claim 1 wherein the at least one settable parameter comprises at least one of a receiver gain stage parameter and a transmitter linearity parameter.

11. A radio frequency (RF) communication device comprising:
    a portable housing;
    an RF spectral sensor carried by the portable housing and configured to sense a dynamically changing RF spectral environment;

RF circuitry carried by the portable housing and having at least one settable parameter;

a power supply carried by the portable housing and coupled to the RF spectral sensor and RF circuitry; and a controller carried by the portable housing and cooperating with the RF spectral sensor, RF circuitry and power supply to periodically sample the RF spectral sensor, determine, based upon the periodic sampling, a current spectral environment classification of an artificial intelligence (AI) model from among a plurality of spectral environment classifications of the AI model, each spectral environment classification of the AI model including at least one respective setting for the at least one settable parameter of the RF circuitry based upon power consumption and RF communication performance of the RF circuitry, operate the RF circuitry using the at least one respective setting for the at least one settable parameter of the RF circuitry according to the current spectral environment classification of the AI model, and store and update training data for the AI model.

12. The RF communication device of claim 11 wherein the AI model is trained so that communications robustness increases when the RF communication performance is more difficult.

13. The RF communication device of claim 11 wherein the AI model is trained so that power consumption decreases when the RF communication performance is less difficult.

14. The RF communication device of claim 11 wherein the controller is configured to use the AI model without network connectivity.

15. The RF communication device of claim 11 wherein the controller is configured to use the AI model with network connectivity.

16. The RF communication device of claim 11 wherein the at least one settable parameter comprises a settable RF waveform parameter.

17. The RF communication device of claim 11 wherein the at least one settable parameter comprises at least one of a receiver gain stage parameter and a transmitter linearity parameter.

18. A method of operating a radio frequency (RF) communication device comprising:

sensing a dynamically changing RF spectral environment with an RF spectral sensor; and operating a controller that cooperates with RF circuitry and with the RF spectral sensor to sample the RF spectral sensor, determine, based upon the sampling, a current spectral environment classification of an artificial intelligence (AI) model from among a plurality of spectral environment classifications of the AI model, each spectral environment classification of the AI model including at least one respective setting for the at least one settable parameter of the RF circuitry based upon power consumption and RF communication performance of the RF circuitry, and operate the RF circuitry using the at least one respective setting for the at least one settable parameter of the RF circuitry according to the current spectral environment classification of the AI model.

19. The method of claim 18 comprising using a power supply carried by a portable housing to supply the RF spectral sensor, RF circuitry, and controller.

20. The method of claim 18 comprising operating the controller to periodically sample the RF spectral sensor.

21. The method of claim 18 comprising training the AI model so that communications robustness increases when the RF communication performance is more difficult.

22. The method of claim 18 comprising training the AI model so that power consumption decreases when the RF communication performance is less difficult.

23. The method of claim 18 comprising operating the controller to store and update training data for the AI model.

24. The method of claim 18 comprising operating the controller to use the AI model without network connectivity.

25. The method of claim 18 comprising operating the controller to use the AI model with network connectivity.

26. The method of claim 18 wherein the at least one settable parameter comprises a settable RF waveform parameter.

27. The method of claim 18 wherein the at least one settable parameter comprises at least one of a receiver gain stage parameter and a transmitter linearity parameter.

* * * * *